3,556,725
PROCESS FOR PRODUCING LOW-BULK
DENSITY SILICA
Vincent Chiola, Joseph E. Ritsko, and Clarence D. Vanderpool, Towanda, Pa., assignors to Sylvania Electric Products Inc., a corporation of Delaware
No Drawing. Filed Feb. 26, 1969, Ser. No. 802,628
Int. Cl. C01b 33/12
U.S. Cl. 23—182         8 Claims

ABSTRACT OF THE DISCLOSURE

An improvement to the process for producing silica from tetraalkyl silicate comprising conducting the hydrolysis of the tetraalkyl silicate in the presence of a cationic surface active agent to thereby control the bulk density of the resulting silica between bulk densities of from about 6 pounds per cubic foot and about 23 pounds per cubic foot.

BACKGROUND OF THE INVENTION

This invention relates to a process for preparing low-bulk density silica. More particularly it relates to an improvement to the process for preparing silica whereby the hydrolysis of tetraalkyl silicates is controlled to provide a silica having a lower and controlled bulk density.

The methods heretofore widely used for the production of silica sols involved the neutralization of an alkali metal silicate and thereafter washing to remove residual alkali salts. This method requires extensive purification of the silica to produce a high-purity product.

Other methods heretofore known for producing silica involve the hydrolysis of silicon-containing compounds to form an insoluble silica such as the hydrolysis of silicon tetrachloride or tetraethyl orthosilicate. While these above methods tend to provide relatively pure silicas, the methods generally produce silica having bulk densities above about 30 lbs./cubic foot. In the synthesis of at least some silicate products, particularly inorganic phosphors, bulk densities of silicas from about 6 to about 23 lbs./cubic ft. are highly desirable. It is also desirable that processes for producing the silicas are reproducible, that is, the process can be controlled from batch to batch to produce silicas having essentially the same bulk density. Heretofore, the processes required that the product be milled and classified to obtain the desired bulk density, thus adding to the cost of manufacture. It is believed therefore, that a process that produces low-bulk density silica and enables the control of the bulk density of the silica produced would be an advancement in the art.

SUMMARY OF THE INVENTION

In accordance with one aspect of this invention, high-purity silica having controlled bulk density within the range of from about 6 to about 23 pounds/cubic foot can be prepared by conducting the ammoniacal hydrolysis of tetraalkyl silicates in the presence of a cationic organic surface active agent.

For a better understanding of the present invention, together with other and further objects, advantages and capabilities thereof, reference is made to the following disclosure and appended claims in connection with the above description of some of the aspects of the present invention.

DESCRIPTION OF THE PREFERRED EMBODIMENTS

In the practice of this invention, the ammoniacal hydrolysis of tetraalkyl silicate, $Si(OR)_4$, wherein R is alkyl, to silica, $(SiO_2)$ is conducted in an aqueous reaction media containing sufficient amounts of a synthetic organic cationic surface active agent as hereinafter specified to thereby control the bulk density of the resulting silica.

The production of silica via the ammoniacal hydrolysis is known and is not detailed herein. In general, the process comprises forming an aqueous mixture of water, hydrolyzable tetraalkyl silicate, such as tetraethyl silicate, and an ammonia source to thereby yield a basic pH and enabling the hydrolytic formation of $SiO_2$ and an aliphatic alcohol. In most instances the preferred tetraalkyl silicate will be tetraethyl orthosilicate. The preferred ammonia sources are ammonium hydroxide and ammonium salts such as ammonium carbonate.

Synthetic organic cationic surface active agents are well known. Individual cationic surface active agents can be found in standard detergent references such as Schwartz and Perry, Surface Active Agents, Interscience Publishers Inc., New York, N.Y. (1949), Schwartz, Perry and Berch, Surface Active Agents and Detergents, Interscience Publishers Inc., New York, N.Y. (1958), and Sisley & Wood, Encyclopedia of Surface Active Agents, Chemical Publishing Co. Inc., New York, N.Y. (1952).

Although generally any water-soluble synthetic cationic surface active agent can be used to achieve the benefits of this invention, it is preferred to use the quaternary ammonium halides of the formula Formula 1

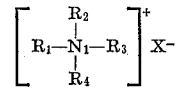

wherein X is a halide and $R_1$, $R_2$, $R_3$, and $R_4$ each are selected from the group consisting of aliphatic, aryl, alkoxy ether radicals and heterocyclic radicals with at least two of the foregoing R groups being lower alkyl and at least one of the foregoing R groups being selected from the group consisting of aliphatic radicals containing at least 12 carbon atoms (referred to herein as higher alkyl) aryl, heterocyclic and alkyl ether radicals.

Illustrative of the foregoing class of compounds are the mono higher alkyl-tri (lower alkyl)-ammonium halides; the mono higher alkyl-di(lower alkyl)-mono aryl ammonium halides, the mono-aryl-tri(lower alkyl)ammonium halides, and the mono dialkoxylether-di-(lower alkyl)-aryl ammonium halides.

Illustrative of the suitable mono higher alkyl-tri(lower alkyl) ammonium halides are:

hexadecyl trimethyl ammonium bromide
hexadecyl triethyl ammonium chloride
hexadecyl dimethyl ethyl ammonium chloride
octyldecyl trimethyl ammonium chloride
hexadecyl trimethyl ammonium chloride
triacontyl trimethyl ammonium chloride Illustrative of the suitable mono higher alkyl-di(lower alkyl)-mono-aryl ammonium halides are:

hexadecyl dimethyl benzyl ammonium chloride
octyldecyl dimethyl benzyl ammonium chloride dodecyl diethyl benzyl ammonium bromide
nondecyl dimethyl tolyl ammonium chloride
tridecyl diethyl benzyl ammonium bromide Illustrative of the suitable mono aryl-tri(lower alkyl) ammonium halides include:

dodecylbenzyl trimethyl ammonium chloride
dodecylbenzyl triisobutyl ammonium bromide
dodecylxylyl trimethyl ammonium chloride
hexadecylbenzyl trimethyl ammonium chloride
hexadecylphenyl triethyl ammonium chloride Illustrative of the suitable mono-alkoxyether-di(lower alkyl)-aryl ammonium halides include:

diisobutylphenoxyethyl dimethyl benzyl ammonium chloride
lauryloxyethyl diethyl benzyl ammonium bromide
hexadecyloxyethyl dimethyl xydyl ammonium chloride
octadecyloxyethyl dipropyl benzyl ammonium chloride
octadecyloxyethyl diisobutyl tolyl ammonium chloride
ethoxylated phenyl trimethyl ammonium chloride The above cationic surface active agents are useful because at least one of the groups generally contains twelve or more carbon atoms and the lyophilic portion of the molecule is cationic. It is to be noted that the aliphatic groups in Formula 1 can be alike or different, substituted or unsubstituted, branched or straight chain and preferably contain from about 12 to about 30 carbon atoms. Also, heterocyclic radicals such as pyridyl ($C_5H_5N-$) and quinolyl ($C_9H_6N-$) can be one of the R groups in Formula 1. Selection of the particular cationic surfactant will be dependent upon several factors such as the bulk density desired in the final silica product, the cost of the surfactant and its availability.

The amount of the water-soluble cationic surface active agent can be varied from a weight ratio of tetraalkyl silicate (on an $SiO_2$ basis) to surface active agent of from about 150:1 to about 500:1 and the benefits of this invention will be achieved. Use of smaller amounts of surfactant do not achieve the desired change in bulk density. Use of larger amounts of surfactant result in a product that is suitable, however, no appreciable additional benefits are achieved with the larger amounts, therefore, these larger amounts are not generally used. It is preferred to use weight ratio of tetraalkyl silicate to the cationic surface active agent of from about 250:1 to about 300:1.

It is necessary that the cationic surfactant be present in the hydrolysis media at the time of hydrolysis. Although the order of addition of the tetraalkyl silicate and ammonia source is not critical, it is necessary that the surfactant be added to the media prior to the addition of both of the reactants.

The temperature of the reaction media can be varied, although in general the hydrolysis occurs more rapidly at higher temperatures. Some foaming in the reaction media occurs with some of the suitable surfactants at temperatures much above 40° C., therefore preferred temperatures are in the range of from about 25° C. to about 35° C.

As previously mentioned, the selection of the cationic surfactant will be dependent upon several factors including the particular silica bulk density that is desired. It has been found that the process is reproducible; that is, essentially the same bulk density will be obtained when the same cationic surfactant is used regardless of the level of usage within the desired range. Selection of the suitable appropriate cationic surfactant can be readily ascertained by one skilled in the art from the detailed examples.

If desired, lower-purity silica, produced by other processes and having an extremely low-bulk density (from about 2 to about 4 lbs./ft.$^3$), can be incorporated into the reaction media at the time of the ammoniacal hydrolysis of the tetraalkyl silicate. The product quality is equivalent to silica that is produced without the lower-purity silica. The silica so produced can be more economical on an $SiO_2$ basis. The weight ratio, on an $SiO_2$ basis, of the lower bulk density silica to tetraalkyl silicate is preferably from about 1:3.5 to about 1:4. Amounts of lower bulk density silica in excess of a ratio of about 1:3 of lower bulk density silica to tetraalkyl silicate should not be used.

To further illustrate the invention, the following detailed examples are presented. All parts, proportions and percentages are by weight unless otherwise indicated.

EXAMPLE I

About 8.3 parts of hexadecyl trimethylammonium chloride are dissolved in about 42 parts of reagent-strength 28% ammonium hydroxide in a glass-lined agitator-equipped reactor. While maintaining temperature between about 15° C. and about 25° C. and with agitation, about 9 parts of a commercially available "condensed" grade of tetraethyl orthosilicate containing 28% $SiO_2$ is added. Hydrolysis and precipitation begin within a few minutes after the addition is completed. To insure complete hydrolysis, the mixture is agitated for about 1.5 hours at essentially room temperature. The white slurry of $SiO_2$ is transferred to polyethylene-lined trays and evaporated to dryness at about 70° C. The dry $SiO_2$ product is recovered at about 95% yield and at a bulk density of about 6.1 lb. per cubic foot. In other experiments using hexadecyl trimethylammonium chloride, high-purity $SiO_2$ is recovered in yields greater than about 95% and the bulk densities of about 6.9, 7.4 and 7.6 pounds per cubic foot are achieved. The product of Example I is evaluated in manufacture of a zinc orthosilicate phosphor. Light output of lamps made from this phosphor is measured as about 175 lumens higher output than a control lamp made with a standard phosphor using commercially available $SiO_2$.

EXAMPLE II

About 10 parts hexadecyl trimethylammonium chloride is dissolved in about 50,000 parts of reagent-grade 28% ammonium hydroxide. With agitation about 10,000 parts of a commercial "condensed" grade (28% $SiO_2$) tetraethyl orthosilicate is added. The temperature is about 15° C. after ten minutes of agitation. Hydrolysis to form a white precipitate begins after about ten minutes of agitation. To complete the hydrolysis the solution is warmed to about 35° C. After one hour the $SiO_2$ slurry is placed in trays at about 70° C. to evaporate the alcohol by-product of hydrolysis, as well as the water and ammonia. Bulk density of the product is about 6.9 pounds per cubic foot.

EXAMPLE III

The procedure used in Example II is repeated except that the surfactant is not added. The $SiO_2$ product has a bulk density of about 31.6 pounds per cubic foot versus 6.9 pounds per cubic foot as obtained when hexadecyl trimethylammonium chloride is used.

EXAMPLE IV

The procedure used in Example II is followed except that the following materials are added to the reaction mixture: about 4200 parts of tetraethyl silicate (28% $SiO_2$), about 4.1 parts of hexadecyl trimethylammonium chloride, about 9240 parts of an aqueous 28% solution of ammonium hydroxide and about 300 parts of a fused silica having a bulk density of from about 2–3 lbs./ft.$^3$. The product produced has a bulk density of from about 6 to about 7.5 lbs. per cubic foot.

EXAMPLE V

Other tests are performed using the conditions described Examples I and IV, with substitution of other surfactive agents for hexadecyl triethylammonium chloride.

The results are summarized in Table I showing the bulk density obtained with each of the surfactants.

TABLE I

| Test No. | Bulk density, lbs./cu. ft. | Type | Surfactant |
|---|---|---|---|
| 1 | 6.0-7.6 | Cationic | Hexadecyl trimethyl-ammonium chloride. |
| 2 | 6.5 | do | Octadecyl trimethyl-ammonium chloride. |
| 3 | 7.6 | do | Hexadecyl trimethyl-ammonium bromide. |
| 4 | 8.4 | do | Hexadecyl triethyl-ammonium chloride. |
| 5 | 9.5 | do | Hexadecyl dimethyl-benzyl ammonium chloride. |
| 6 | 9.5 | do | Ethanolated alkyl guanadine amine complex. |
| 7 | 9.9 | do | Octadecyl trimethyl-ammonium chloride. |
| 8 | 12.2 | do | Methyl dodecylbenzyl trimethyl ammonium chloride. |
| 9 | 15.9 | do | Octadecyl dimethyl-benzyl ammonium chloride. |
| 10 | 19.8 | do | Diisobutyl phenoxy-ethyl dimethylbenzyl ammonium chloride. |
| 11 | 20.6 | do | Dodecyl isoquinalinium bromide. |
| 12 | 21.3 | do | Polyvinyl pyrrolidone. |
| 13 | 22.8 | do | Hexacecyl dimethyl-ethyl ammonium bromide. |

While there have been shown and described what is at present considered the preferred embodiments of this invention, it will be obvious to those skilled in the art that various changes and modifications can be made therein without departing from the scope of the invention as defined by the appended claims.

What is claimed is:

1. In the process for producing low-bulk density silica by the ammononical hydrolysis of a tetraalkyl silicate, the improvement comprising conducting said hydrolysis in an aqueous reaction media containing a sufficient amount of a water soluble organic cationic surface active agent to produce and to control the bulk density of said silica between about 6 lbs./cubic foot and up to 23 pounds per cubic foot and wherein the weight ratio of said tetraalkyl silicate to said cationic surface active agent on an $SiO_2$ basis is from 150:1 to about 300:1 and said hydrolysis is effected at a temperature below about 35° C. to prevent any foaming in the said reaction media, and recovering said low-bulk density silica.

2. An improvement according to claim 1 wherein said reaction media contains an impure, low-bulk density silica, and wherein the weight ratio, on an $SiO_2$ basis, of said low-bulk density silica to tetraalkyl silicate is from about 1:3.5 to about 1:4, to thereby up-grade said impure silica material while other silica is being produced by hydrolysis of the tetraalkyl silicate.

3. A process according to claim 2 wherein said tetraalkyl silicate is tetraethyl orthosilicate.

4. A process according to claim 3 wherein said cationic surface active agent is a quarternary ammonium halide.

5. A process according to claim 4 wherein said cationic surfactant is a mono-higher alkyl-tri(lower alkyl) ammonium halide.

6. A process according to claim 5 wherein said surfactant is hexadecyl trimethyl ammonium chloride.

7. A process according to claim 6 wherein the weight ratio of said low-bulk density silica to said tetraethyl orthosilicate, on a $SiO_2$ basis, is from about 1:3.5 to about 1:4.

8. A process according to claim 7 wherein the weight ratio of tetraethyl silicate, on an $SiO_2$ basis, to hexadecyl trimethyl ammonium chloride is from about 250:1 to about 300:1.

References Cited

UNITED STATES PATENTS 3,322,498  5/1967  Quinn et al. _____ 23—182

OTHER REFERENCES

"Organosilicon Compounds," book by C. Eaborn, 1960 ed., p. 301, Academic Press Inc., New York.

EDWARD STERN, Primary Examiner